United States Patent

[11] 3,595,154

[72] Inventor Winfried Espig
Calmbach, Black Forest, Germany
[21] Appl. No. 757,050
[22] Filed Sept. 3, 1968
[45] Patented July 27, 1971
[73] Assignee Prontor-Werk Alfred Gauthier G.m.b.H.
Calmbac, Germany
[32] Priority Sept. 2, 1967
[33] Germany
[31] P 15 97 361.2

[54] PHOTOGRAPHIC CAMERA WITH ELECTRONIC TIMING DEVICE AND LEADTIME CONTROL FOR SELF-TIMER PHOTOGRAPHS
5 Claims, 4 Drawing Figs.
[52] U.S. Cl................................... 95/53.3, 95/53
[51] Int. Cl................................... G03b 9/64
[50] Field of Search......................... 95/53.3, 53, 63

[56] References Cited
UNITED STATES PATENTS
3,223,013 12/1965 Rentschler.................. 95/53.3
3,450,015 6/1969 Reimann et al.............. 95/53.3 X Primary Examiner—Samuel S. Matthews
Assistant Examiner—Richard L. Moses
Attorney—March, Gillette and Wyatt ABSTRACT: A camera having an electronic time setting device including an electromechanical open-time stop for the shutter drive. With this there is provided an electronic delaying circuit which can be transferred into an operational readiness state for temporarily locking the action of the shutter following the depression of the release button, and a signal light control which indicates both the beginning and the end of the operation of the delayed action cutoff.

3,595,154

INVENTOR
Winfried Espig
BY
March, Gillette & Wyatt
ATTORNEYS

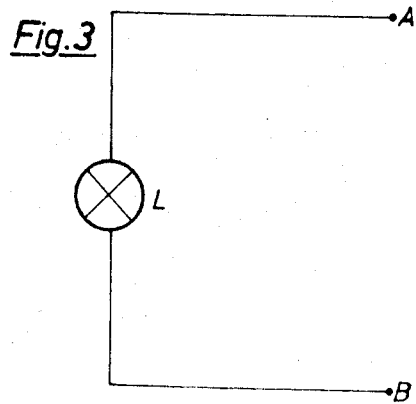
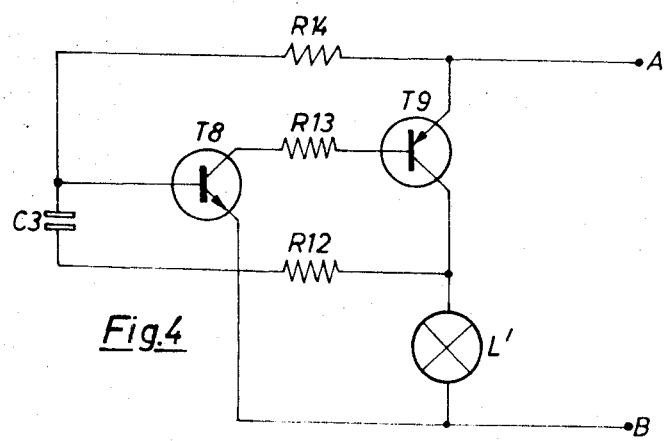

PHOTOGRAPHIC CAMERA WITH ELECTRONIC TIMING DEVICE AND LEADTIME CONTROL FOR SELF-TIMER PHOTOGRAPHS

The invention concerns a camera with an electronic exposure timing device including an electromechanical open-time-stop for the shutter, and provided with an electronic delayed shutter action which temporarily locks the shutter mechanism after depression of the release button.

Whilst in cameras with mechanical delayed action the sounds occuring during the action thereof are perceptible under certain conditions by the photographer, the shutter delay action in cameras having an electronic control therefor is completely silent. Thus the only perceptible action of an electronically delayed shutter is the sound emanating from the mechanical shutter parts when the exposure is made, so that a shutter fitted with an electronic delayed action gives no indication as to the time available before the actual exposure. In practical usage with electronic cameras this is considered a nuisance inasmuch as after the release is actuated, the photographer remains uncertain as to when and/or whether the shutter delay action has been initiated.

The object of the present invention is to remove this drawback of hitherto known electronic cameras by providing a signal light which clearly indicates to the photographer both the beginning and the end of the action of the time delay device.

A preferred embodiment requiring a minimum of parts uses a lamp which lights continuously during the action of the time-delay device.

According to a further embodiment, a more clearly perceptible arrangement can be obtained from a signal lamp which flashes continuously. For this purpose an unstable multivibrator comprising a capacitor, several resistors and two complementary transistors is used, the filament of the lamp forming the load resistor for one of the two transistors.

The lamp circuit is extended to the delayed action by two leads one of which includes a contact switch to be actuated when operating the shutter release button, and the other includes a switch actuated at the end of the delayed action period.

Apparatus in accordance with the invention for indicating the state of the electronic delayed action circuit is described below in detail with reference to a camera having a shutter fitted with an electronic timing device and electronic delay action, in the accompanying drawings.

FIGS. 3 and 4 show alternative circuits for the signal lamp.

Figure 1:
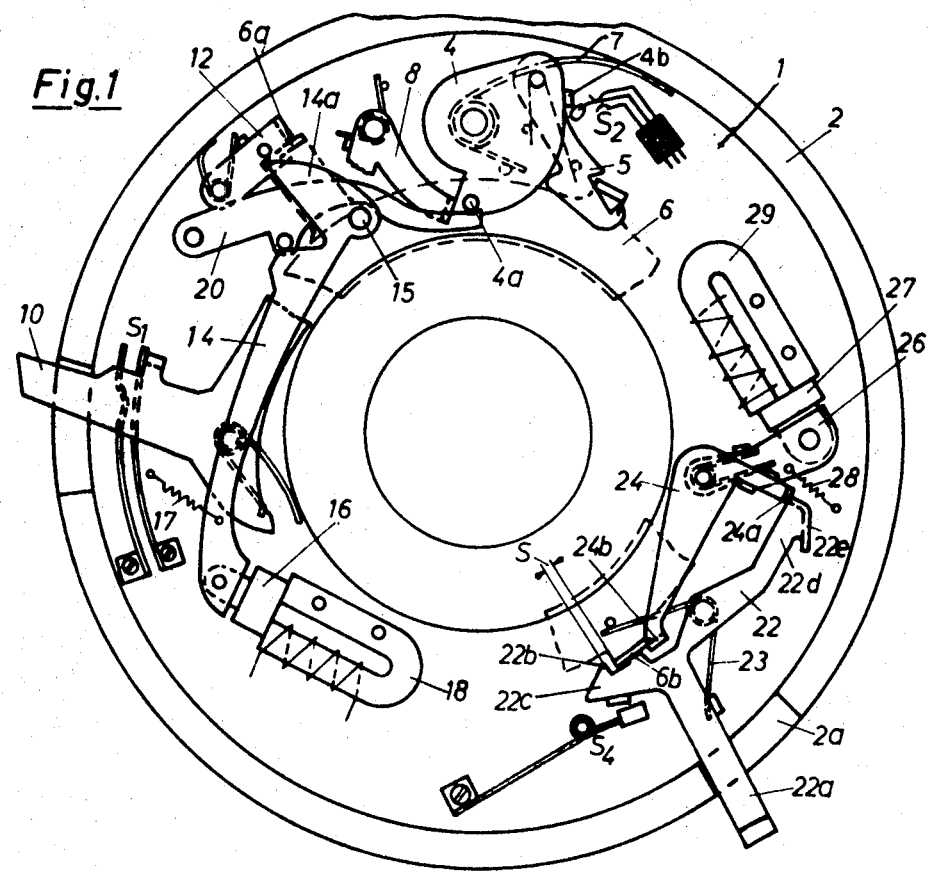
FIG. 1 shows a plan view of the electronic shutter in the cocked position and prepared for delayed action exposure, with cover plate removed.

Numeral 1 in FIG. 1 denotes a baseplate and 2 the housing of the shutter. On the baseplate 1 there is arranged a driving mechanism which is formed of a rotatably mounted disc 4, a thrust pawl 5 connected thereto and a sector ring 6 engaging therewith. A driving spring 7 rotates the disc 4 in 10. clockwise direction after its release, the sector ring 6 executing a reciprocating movement. In the cocked position as shown in FIG. 1 the disc 4 is arrested by a two-armed release lever 8, which in turn is moved out of the locked position by means of an actuating lever 10.

The shutter driving mechanism has an electronically controlled timing device associated therewith which includes an electromechanical open time stop. The latter has a trapping lever 12 which at the end of the opening movement of the sector ring 6, biased by spring action, slips off its arm 6a and assumes a position in front of the end face, resulting in locking the shutter drive. At the end of the time interval during which the shutter is to be held in the open position, the trapping lever 12 is moved out of the stop position by the arm 14a of an armature lever 14. The armature lever 14 is mounted on a pin 15 and carries an armature 16. The latter during the cocking of the shutter, is forcibly caused to abut against an electromagnet 18, against the action of a return spring 17, for which a pressure application lever 20 is provided which during the cocking operation is engaged by a pin 4a of the driving disc 4 and thus swings the armature lever against the electromagnet 18.

The shutter arrangement described above is provided with an optionally useable electronic device which temporarily delays the action of the shutter after depression of the release button. This device, as shown by the example, is provided with a three-armed stop lever 22 which is transferred against the action of a relay spring 23 into the locking position as shown in FIG. 1 by means of its arm 22a. In this position a locking edge 22b of the arm 22c assumes a position in front of the flap 6b of the sector ring 6. The third arm 22d, which has a downwardly bent flap 22e, has a lever mechanism associated therewith comprising a two-armed supporting lever 25 and a coaxially mounted armature lever 26. The levers 24 and 26 positively interconnected and have a spring-controlled lost motion. At one end the lever 24 is provided with a flap 24a against which in the locking position the stop lever 22 is supported. At the other resiliently yielding end of the supporting lever 24 a downwardly bent flap 24b is formed which, when the stop lever is in the locked position as shown in FIG. 1, assumes a position in front of the flap 6b of the sector ring 6. In this position, the armature lever 26 with its armature 27 is supported against an electromagnet 29 and biased by a return spring 28.

Figure 2:
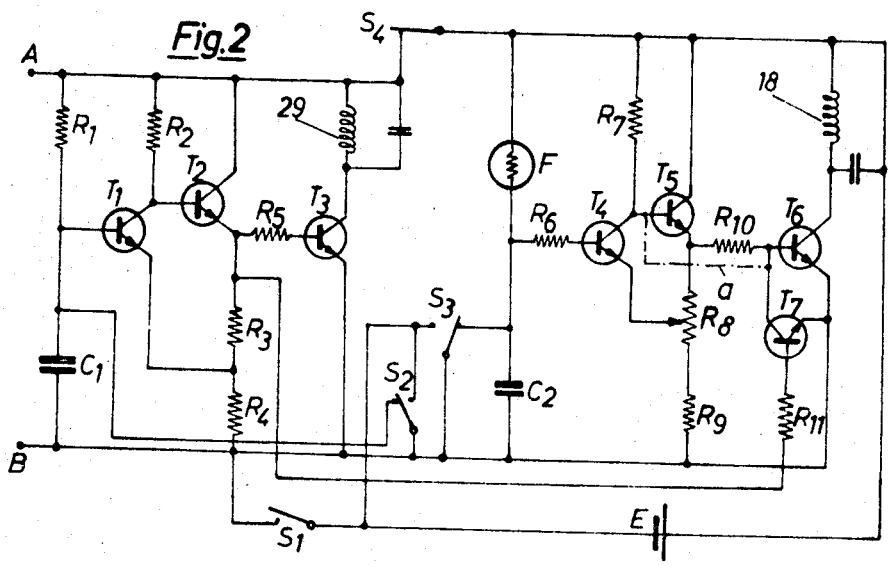
FIG. 2 shows the circuit diagrams for the electronic control of delay time and exposure time, with terminals A and B in the circuit of the electronic delay time device for connecting a signal lamp to indicate the action of the delaying device.

As already indicated, the device effects delay of the shutter action electronically. For this purpose the electromagnet 29 of this device is included in an electric circuit which, as shown in FIG. 2, is formed as a transistor relaxation circuit. The latter includes two emitter-coupled transistors $T_1$ and $T_2$, a further transistor $T_3$ and an RC circuit formed by a resistor $R_1$ and capacitor $C_1$. Further components of this circuit are the resistors $R_2$ to $R_5$, connected as shown in FIG. 2. The base of transistor $T_3$ is connected via resistor $R_5$ to the emitter of transistor $T_2$ acting as end transistor of the relaxation circuit, whilst the coil of the electromagnet 29 is located in the collector circuit of transistor $T_3$.

To control the exposure time, as shown in FIG. 2, an electronic time control circuit includes transistors $T_4$, $T_5$, and $T_6$, a RC circuit formed of photoresistor F and capacitor $C_2$, and resistors $R_6$ to $R_{10}$. The coil of the electromagnet 18 cooperating with the open-time stop mechanism of the shutter, is in the collector circuit of transistor $T_6$.

A switch $S_1$, which is closed on actuation of the lever 10 is provided to connect the above-described circuits to a battery. The switch $S_2$ formed as a changeover, in the contact position shown in FIGS. 1 and 2, short-circuits the capacitor $C_1$. In the other contact position the switch $S_2$ acts in parallel with switch $S_1$ in the delayed action circuit, during the period of the delay time. For this purpose switch $S_2$ is actuated by a flap 4b of the driving disc 4. The arrangement therefore is such that directly after the start of the disc 4, but before the renewed locking of the driving mechanism by the stop lever 22, the switch $S_2$ is changed over and for the duration of the delayed action time is retained in this contact position. The switch $S_3$ has the same function in the exposure time control circuit, and is actuated by the sector ring 6. Changing the switch $S_3$ over from the position shown occurs directly after the release of the sector ring 6 by the stop lever 22, but before the return of switch $S_2$ into the short circuit position By means of a further switch $S_4$ one common lead of the delayed action time control circuit can be connected to the battery E to prepare the shutter for a delayed action exposure. This switch $S_4$ is located in the region of the arm 22c of the stop lever 22, which is in its normal position, not shown, where it provides exposures without delayed action retains this switch open. When the stop lever 22 is moved into the locking position, the contact switch $S_4$ closed as shown in FIG. 1.

In the exposure time control circuit a further transistor $T_7$ is provided which carries out the function of a switch with respect to the electromagnet 18. As shown in FIG. 1, $T_7$ is a NPN transistor. The collector-emitter path of this transistor is connected in parallel with the base-emitter path of transistor $T_6$ operated by the exposure time control circuit, its base being connected via resistor $R_{11}$ to the emitter of transistor $T_2$ of the delayed action time control circuit.

To give the photographer clearly visible indications of the circuit conditions when operating a camera which is equipped with an electronic shutter, the camera is provided with a lamp signal which indicates the beginning and the end of the delayed action period when the release button has been depressed. The embodiment shown consists of a lamp L which is connected to terminals A and B of the delayed action circuit shown in FIG. 2. When this is done and when the magnet armature 27 is applied to the magnet 29, the delayed action circuit is brought into a state of readiness and the switch $S_4$ closed, whereupon lamp L lights up when subsequently switch $S_1$ is closed by actuation of the camera release 10. At the same time the exciter coil of the magnet 29 is connected to potential and this holds armature 27 attracted. The result of this is that the flap 6b of the sector ring after a short initial movement S strikes against the edge 22b of the lever 22, the driving disc 4 changing the switch $S_2$ over, so that the short circuit across the capacitor $C_1$ is removed, the potential supply for the circuit is maintained, after the camera release has been released or the switch $S_1$ opens. The lamp L' lights up until the capacitor $C_1$ has sufficiently charged via the resistor $R_1$ to actuate the relaxation circuit comprising the transistors $T_1$ and $T_2$. When this occurs the circuit changes over and blocks transistor $T_3$. This deenergizes the coil of the electromagnet 29 and the armature 27 is released. The armature releases the shutter blade actuating system, whilst simultaneously switch $S_4$ opens and hence one current lead to the lamp L' is interrupted. The lamp may be colored or arranged behind a colored window for the purpose of showing the light signal more clearly, more particularly when taking delayed action photographs in bright sunlight.

A still more effective signalling arrangement is attainable if in place of a constantly lift lamp the circuit shown in FIG. 4 is employed and connected to terminals A and B. This causes the lamp L' to flash during the period which the delayed action is in use. To obtain the flashing effect, an unstable multivibrator is used, formed by a capacitor $C_3$, resistors $R_{12}$ to $R_{14}$ and two complementary transistors $T_8$ and $T_9$.

The filament of the lamp L forms the load resistor of transistor $T_9$. When in this arrangement the switches $S_1$ and $S_4$ of FIG. 2 are closed, the circuit of FIG. 4 receives battery potential. Transistors $T_8$ and $T_9$ are temporarily blocked. Capacitor $C_3$ charges via the filament of the lamp L' and the resistor $R_{12}$ and $R_{14}$. When the threshold potential of transistor $T_8$ has been attained, the latter conducts. This causes the potential of the base of the transistor $T_9$ to fall. The latter now also begins to conduct, with the result that the collector potential of transistor $T_9$ drops. Owing to the feedback path from the collector of transistor $T_9$ via the resistor $R_{12}$ and capacitor $C_3$ to the base transistor $T_8$, the current rises rapidly in both transistors to a maximum. This causes the lamp L' in the collector circuit of transistor $T_9$ to light up.

This state is maintained until capacitor $C_3$ is charged to such an extent that its charging current is no longer sufficient to unblock transistor $T_8$. Since resistor $R_{12}$ is of such a value that it does not maintain transistor $T_8$ unblocked, the circuit returns to its normal or commencing state, the lamp L' being extinguished. Now capacitor $C_3$ begins to recharge via resistor $R_{14}$ and the above-described process is repeated. In this manner the simple circuit shown in FIG. 4 produces a flashing effect on lamp L' until the delayed action circuit has ended its function, which happens when switch $S_4$ is moved by the stop lever 22 when it releases the shutter for action. It is of course possible to use alternative flashing circuits connected to the terminals A and B.

In certain circumstances it may be of advantage to couple the lamp signalling circuit to a device which during or at the beginning and end of the delayed action period emits acoustic signals. Should this be desirable, the signals may be amplified by a further electronic circuit.

What I claim is:

1. Camera apparatus having an electronic time setting device for the shutter drive mechanism which comprises an electromagnetic-mechanical open time control circuit for the shutter drive, an electronic connectable retardation device to arrest the movement of the shutter movement temporarily after release, an indicator lamp to provide a light control to signal the beginning and the end of the function sequence of the retardation device, a circuit connected in parallel to the control circuit of the time-setting and the retardation devices, a signalling lamp connected in said last-named circuit, a first switch means for directly actuating the shutter release, and a second switch means for cutting off the lamp influenced through the control of the retardation circuit.

2. An electronic camera apparatus according to claim 1 comprising, in addition, means to intermittently flash the lighting lamp to provide a flashing light as a light control medium.

3. An electronic camera apparatus according to claim 2, comprising, in addition, a nonrotatable multivibrator for intermittently lighting the lamp, said multivibrator including a condenser, a plurality of resistance elements and a pair of transistor element connected with the lamp so that the filament of the lamp provides the working resistance for one of two transistors.

4. An electronic apparatus according to claim 2 comprising, in addition, a voltage source having its plus and minus poles connected to the two phases of the circuit of the retardation device, one of said phases includes a contact switch that it to be actuated upon release of the shutter, and the other of said phases includes a circuit breaker switch which is actuated upon termination of the prematurity control.

5. Camera apparatus having electronic timing control of the shutter mechanism which includes an electromechanical open-time stop for the shutter drive, and an electronic delaying device transferable into operational readiness for temporarily locking the action of the shutter subsequent to a depression of the release means for the shutter, a light signal for indicating both the beginning and the end of the operation of the delayed action circuit, means to cause the light developed by the light signal to flash during the operation of the delayed electronic device within said circuit, and comprising in addition an unstable multivibrator to control the flashing light effect comprising a capacitor, a plurality of resistors and two complementary transistors, and a connection of the filament of the flashing light to one of the transistors to provide a load resistor therefor.